(12) United States Patent
Easterbrook et al.

(10) Patent No.: US 7,024,747 B2
(45) Date of Patent: Apr. 11, 2006

(54) METHOD OF BUILDING FATIGUE LIFE ENHANCED STRUCTURES

(75) Inventors: Eric T. Easterbrook, Kent, WA (US); Michael A. Landy, Bellevue, WA (US)

(73) Assignee: Stresswave, Inc., Kent, WA (US)

( * ) Notice: Subject to any disclaimer, the term of this patent is extended or adjusted under 35 U.S.C. 154(b) by 19 days.

(21) Appl. No.: 10/370,814

(22) Filed: Feb. 19, 2003

(65) Prior Publication Data

US 2003/0167617 A1 Sep. 11, 2003

Related U.S. Application Data

(60) Provisional application No. 60/358,486, filed on Feb. 19, 2002.

(51) Int. Cl.
*B23P 11/02* (2006.01)

(52) U.S. Cl. .................................................. 29/446
(58) Field of Classification Search ............... 29/446, 29/525, 525.06, 243.53, 243.54, 428, 557; 72/334, 412, 377
See application file for complete search history.

(56) References Cited

U.S. PATENT DOCUMENTS

| | | | |
|---|---|---|---|
| 3,892,121 A | 7/1975 | Champoux et al. | |
| 4,164,807 A | 8/1979 | King, Jr. | |
| 4,741,497 A | 5/1988 | Fox | |
| 5,528,489 A | * 6/1996 | Asahara et al. | 705/9 |
| 6,006,196 A | 12/1999 | Feigin et al. | |
| 6,230,537 B1 | 5/2001 | Easterbrook | |

* cited by examiner

*Primary Examiner*—John C. Hong
(74) *Attorney, Agent, or Firm*—R. Reams Goodloe, Jr.

(57) ABSTRACT

A method of manufacturing a fatigue life enhanced product from a plurality of workpiece parts. At least one fatigue enhancing operation is performed on a first workpiece at a first work station. At least one fatigue enhancing operation is performed on a second workpiece at a second work station. The first and second workpieces are transferred to a first assembly station, where the workpieces are joined to form a fatigue life enhanced product. Aerostructures manufactured according to the method may include components fabricated at different locations to have fatigue life enhancing properties, especially in bounding material adjacent to holes designed to accommodate fasteners. By use of the method, the final assembly step can thus avoid the necessity to include the processing of holes to enhance fatigue life, since this step has been performed prior to bringing components into position to be joined in the final shape or assembly of the airframe.

31 Claims, 4 Drawing Sheets

Proposed Steps Using Upstream Mandrel Cold Working

Fig. 1
Current Steps Using Split Mandrel Cold Working

PRIOR ART

Fig. 2
Current Steps Using Split Sleeve Cold Working
PRIOR ART

Fig. 3
Proposed Steps Using Upstream Mandrel Cold Working

Fig. 4
Proposed Steps Using Upstream StressWave Cold Working

METHOD OF BUILDING FATIGUE LIFE ENHANCED STRUCTURES

This application claims the benefit of U.S. Provisional Application(s) No(s).: Application No.: 60/358,486 Filed: Feb. 19, 2002

RELATED PATENTS AND PATENT APPLICATIONS

This patent application claims priority under 35 USC Section 119(e) from, and consequently the invention is related to, U.S. Provisional Patent Application Ser. No. 60/358,486, filed on Feb. 19, 2002, entitled Method of Building Fatigue Life Enhanced Structures, the disclosure of which is incorporated herein in its entirety, including the specification, drawing, and claims, by this reference.

This invention relates to a business method for carrying out the manufacture of structures having fatigue life enhanced components. One method for treatment of metal structures which is especially useful in carrying out the business method set forth herein is the StressWave™ process, one embodiment of which is explained in U.S. Pat. No. 6,230,537, issued May 15, 2001 to Easterbrook, entitled "Method and apparatus for producing beneficial stresses around apertures by use of focused stress waves, and improved fatigue life products made by the method manufacturing fatigue life enhanced structures", the disclosure of which is incorporated in its entirety by this reference.

TECHNICAL FIELD

This invention relates to a method for performing the manufacture of structures having enhanced fatigue life, such as airframes. More particularly, the invention relates to methods for treatment of metal components of structures to enhance fatigue life of such structures, and to a related method for fabricating a finished product utilizing such structures. In one embodiment, the invention relates to a method for conducting the cold working of material bounding holes in structures, to enhance fatigue life of components having such holes therein, as practiced by a method which reorganizes the traditional order of various steps in the production of airframes, in order to reduce the cost and complexity of building airframes.

BACKGROUND

Metal fatigue is the damage or failure of a metal structure evidenced in the form of cracks. It primarily caused by cyclic tensile loads acting on the structure. Fatigue cracks generally start at the location of highest stress within the structure. Typically, this occurs at a change in section of the structure. A typical change in section would be a fillet radius, bend, hole, notch or other cutout. The change in section causes the otherwise uniform tensile stresses to be concentrated at that location, thus providing a potential weak spot in the structure. Geometric features that increase the local stress in this manner are called stress risers or stress concentrators. By far the most common stress concentrator is a fastener hole. This is easy to understand, since fastener holes concentrate the uniform stress by a factor of three or more at their periphery.

One of the most successful methods for improving the fatigue life of holes in metal structures is a process called cold working. The term cold working covers a number of processes that impart beneficial residual compressive stresses around the hole. In this disclosure, the term cold working will be used broadly to describe three cold-working methods each used for treating holes in structures, namely split sleeve cold working, split mandrel cold working, and StressWave™ cold working. In each of the aforementioned cold-working methods, the improvement in fatigue life is produced by surrounding the hole with a large zone of residual compressive stress in the remaining material structure. Such residual compressive stress reduces the magnitude of the tensile stress at the hole, thereby increasing the fatigue life of the structure.

In the case of both the split sleeve and split mandrel cold working methods, the compressive stresses are imparted into the material bounding the hole by pulling a tapered mandrel through the hole. Basically, the action of pulling the mandrel through the hole plastically expands the wall of the hole and the surrounding bounding material. Material further not immediately at the hole edge wall is also deformed, but to a much lesser extent. The elastically expanded material attempts to return to its original position, as it existed prior to the cold working, but such movement is resisted due to the permanently expanded hole edge wall. As a result, the spring back of the elastic material induces a compressive residual stress around the hole wall.

A forerunner of hole cold working was the mandrel only process. That process required access to both sides of the structure to be worked, since the mandrel diameter was larger than the starting hole diameter. Prior to mandrel insertion a lubricant was manually applied to both the hole and the mandrel to reduce pull force and galling. The attaching end of the mandrel, sticking through the hole, was attached to a pulling device. The pulling device, typically a hydraulic tool, pulled the mandrel through the hole. The treated hole was then drilled to the desired final diameter.

The split sleeve process was developed to improve the efficiency of hole cold working by making it a one-sided process. Also, it allowed an increase in applied expansion by using solid film lubricant coated split sleeve thereby increasing fatigue life; see U.S. Pat. No. 3,892,121. The use of a dry-film lubricant applied only to the mandrel contacting side of the sleeve eliminated the requirement for applying lubricants manually. The one-sided split sleeve process reduced cold working labor hours significantly. Additionally, the sleeve protected the hole against scoring and galling caused by the sliding contact of the mandrel. Undesirably, though, an axial 'ridge' is left in the hole as a result of the split in the sleeve, and that ridge needs to be machined out of the hole in most cases.

The split mandrel process, also a one-sided hole cold-working method, was developed to eliminate the disposable split sleeve; see U.S. Pat. No. 4,164,807. The system features a collapsible hollow mandrel and a high film-strength liquid lubricant, typically cetyl alcohol. A solid pin in the center of the collapsible mandrel is used to provide support for the mandrel during expansion. Before mandrel insertion into the hole the center pin is retracted and the mandrel collapsed. After the mandrel is inserted into the hole, the center pin is then pushed into the mandrel to make it "solid". A spray mist of liquid lubricant is applied automatically to the hole just before the mandrel is pulled through.

The split sleeve and split mandrel hole cold working methods are used routinely in assembly of new and the rework of existing structures. For production and assembly of new aircraft structures with cold worked holes, the currently utilized method is to pre-assemble the various components such as a wing skin and a stringer using tack fasteners, drill the required undersized starting hole through each of the layers in the assembly, then cold work the hole. After cold working, the hold is then drilled to the desired final diameter. Since the starting hole passes through all the layers of an assembly, the cold working tooling can treat all layers, for a single hole, in the same operation.

Rework of an existing structure the process is very nearly the same as just described for new holes in aircraft structures. In a rework operation the existing hole is reamed up to a proper starting hole diameter for cold working. The starting holes in each layer of the assembly are cold worked in the same cold-working operation. After cold working, the hole is reamed up to its desired final diameter. The diameter of the as cold worked hole is typically about 0.015 inches less than the desired final diameter. Because of the tooling and manpower involved in the setup, initial drilling, cold-working, and final reaming steps, the cost of cold working at the assembly level is rather high. As a result, it would be desirable to eliminating cold working during the final assembly process.

BRIEF DESCRIPTION OF THE DRAWING

In order to enable the reader to attain a more complete appreciation of the invention, and of the novel features and the advantages thereof, attention is directed to the following detailed description when considered in connection with the accompanying drawings, wherein.

The foregoing figures, being merely exemplary, contain various elements that may be present or omitted from actual implementations of the method(s) disclosed, depending upon the circumstances. An attempt has been made to draw the figures in a way that illustrates at least those elements that are significant for an understanding of the various embodiments and aspects of the invention. However, various other elements of the exemplary methods provided, especially as applied for different applications and variations of the fatigue life enhancement processes described, may be utilized in order to provide an advantageous manufacturing method for providing fatigue life enhanced products such as aerostructures.

DETAILED DESCRIPTION

Removing cold working from the final assembly process in the manufacture of aircraft structures, and thus moving cold working activities to earlier stages in the manufacturing process, particularly to the piece-part and/or sub-assembly stages, can provide significant benefits to the airframe manufacturer. Such benefits include lower production costs, greater part throughput, reduced complexity of assembly, reduced or eliminated inventory of cold working tools in the airframe manufacturer's final assembly facility, and overall, reduced labor cost for the finished structure. Importantly, eliminating cold working at the final assembly stage of aircraft production can minimize or eliminate the need for off-line work stations which take up floor space and thus increase the square footage of existing assembly plants. Such off-line areas (non-automated production) as are currently required for manual operations such as cold working may be substantially reduced or eliminated entirely by use of the upstream cold working method taught herein.

In so far as we are aware, such upstream cold working has not been performed heretofore on individual members of assemblies in aircraft manufacturing, evidently mainly because of the fundamental asymmetric nature of the split sleeve and split mandrel processes. Each of those processes locally deforms a small amount of material around the holes. Consequently, in a long slender part with a high number of closely spaced holes, such as in the case of a stringer, the buildup of such small deformations can cause warping, twisting, elongation, or any combination thereof to the part. Thus, with such prior art techniques, the cold working of holes in separate pieces, and then reaming the holes to the final diameter and joining the pieces together in a final assembly operation would invariably cause mismatch of holes and other features. Because such deforming and warping affects the ability to cold work certain structures, treatment of multi-layer structures has been limited to the point of final assembly. In prior art cold working techniques, when the layers are cold worked as an assembly, the deformation is controlled by having sufficient connections (via use of tack fasteners and the like) so that the individual layers are allowed to deform together.

Unlike prior art cold working processes, via use of the method of upstream cold working utilizing the techniques set forth herein, piece-parts and sub-assemblies can be cold worked separately, even at locations remote each from the other, and then the components which have been individually cold worked can be brought together for final assembly. This method is also made possible be predicting and controlling a number of parameters. Such parameters include (1) placing the starting holes accurately into the individual layers of the assembly using modern machine control techniques, (2) predicting the relative change in cold worked geometry using non-linear finite element software, (3) fixing the individual part such that there is little movement during the cold working operation, (4) straightening or re-forming the part after it has been cold worked and (5) mechanically forcing the part into place at the assembly level.

Accurate placement of the starting holes in the piece-part or sub assembly is essential for cold working parts separately prior to final assembly. Modern machine tools and shop practices have the capability to perform this function within tight tolerances. Placement of the starting holes is influenced by the warp of the part due to cold working discussed below. The final position of the hole is likely to change after cold working. Therefore, accurate placement of the holes must take into account future shifts and movement of the holes as well as overall part distortion.

The prediction of the deformation of a cold worked component is made using sophisticated non-linear finite element analysis. The analysis predicts the gross distortion of parts that have one or more cold worked holes. The residual stresses produced by the cold working methods vary through the thickness of the part, i.e., the length of the hole.

The mandrel exit side of the hole tends to have a greater degree of residual stresses than the mandrel entry side of the hole. The varying degree of residual stress from one end of the hole to the other can have a significant effect on the overall deformation of the part. A long part with a row of holes that is cold worked from one side tends to bend away from the mandrel exit side. Thus, a long flat bar with a row of closely spaced cold worked holes will bend away from the puller unit with a radius consistent with the differential growth of the ends of the holes. Furthermore, the bar will be slightly longer after cold working because both ends of the hole will be increased albeit differentially. The difficulty of predicting the bend and warp increase with the increasing complexity of each unique section. For example, a 'Z' shaped stringer cold worked on one flange will have different warping characteristics than the flat bar mentioned above. Members with small cross sectional areas will tend to warp more than members with higher cross sectional areas.

The application of the cold working process can be adjusted as necessary using finite element analysis as a guide to minimize part deformation. Since two or more members make up the assembly, finite element analysis must be performed on each member to determine the relative movement of the holes.

Placing parts into rigid frames or other devices to prevent movement/shifting of holes and overall part distortion is another means for ensuring that parts cold worked at the piece-part and sub assembly stage can be assembled successfully. The rigid frame internally stores the deformation (strain) energy imparted by the cold working process into the part and "releases" that strain energy once the part has been installed and fastened on to the structure. The strain energy of the part is released into the assembly to which it is fastened. The internal strain energy of the completed assembly is roughly equivalent to that of an assembly where the various parts are cold worked as an assembly. The rigid frames allows for good match of the holes prior to line reaming and installing the fasteners.

Using automated or manual shot peening, stretching and other mechanical methods are conventional means for straightening warped and deformed parts. Straightening is routinely done after processing such as heat-treating, forging, milling, and the like. It has not been applied to warped or deformed cold worked parts that are prepared for assembly with other cold worked parts.

Finally, individual parts that are deformed from the cold working operation can be, in some cases, forced mechanically into alignment with each other at the assembly process. Many slender members with rows of cold worked holes can be easily pushed into a fixture that holds them in alignment with another piece in the assembly. This is the last step in ensuring that parts cold worked individually can be assembled together with minimal mismatch in the hole locations.

Holes cold worked at either the piece-part or sub assembly stages of production can either be machined to the final diameter or left "as is" after cold working. It is preferable to leave the holes "as is" after cold working as they can be machined as an assembly to enhance fit up and alignment. Any small misalignment in the holes can be cleaned up with a reamer of similar cutting tool.

The StressWave™ process can be applied both to piece-parts and to assemblies of parts. Because in one embodiment the process provides indenters which act symmetrically to both sides of a single layer component, a uniform zone of residual stress is provided through the thickness of the part. In other words, the residual stresses on one side of the hole are nearly the same as the other side of the hole. This reduces part deformation as compared to the prior art split sleeve or split mandrel process. Another feature of the StressWave process that makes it a better choice for piece-part cold working is that the dimple diameter is smaller than the "as cold worked" hole diameters of the split sleeve and split mandrel processes. This allows greater mismatch of the parts prior to drilling the final hole while ensuring cleanup.

Other benefits of cold working the piece-parts apply equally to the mandrel methods and to the StressWave. Such benefits include the ability to provide different levels of fatigue life enhancing treatment in different layers, a reduction in the maximum force required to treat the piece-parts as compared to cold working an entire assembly, increased tool life, increased access for inspection of individual parts (including the ability to easily determine the fatigue life enhancement attained in the part, before assembly), and increased ability to handle parts.

Some assemblies are made of dissimilar metals that would generally require differing levels of cold work, usually commensurate with their yield strength. For such assemblies, the prior art processes required a trade-off, usually resulting in the entire stack thickness being treated with one level of cold working targeted at the layer that requires the greatest fatigue life improvement. Importantly, utilizing the method taught herein, cold working individual piece-parts allows for different levels of treatment to be imparted to the different layers.

One important example is the use of a titanium part and an aluminum part which are stacked in a layer to form an assembly. The titanium requires maximum cold working to properly enhance a hole therein against premature fatigue failure, while the aluminum, at least in a non-preferential grain direction, requires a minimum level of cold working to prevent premature failures from stress corrosion cracking. Clearly, piece-part cold working as taught herein offers greater flexibility, Another benefit of utilizing the method of distributed manufacture of components including fatigue life enhanced features as disclosed herein, which benefit accrues to all forms of hole cold working is the reduction in maximum force necessary to treat a piece-part, as compared to an assembly. The holes in assembled structure which is being treated by prior art methods have discontinuities along the bore at the interfaces of adjoining members. Such discontinuities typically increase the pull force by forcing the mandrel over a "step" in the hole. Those interface discontinuities can lead to both sleeve and mandrel breakage.

Importantly, split sleeve and split mandrel maximum pull forces can be reduced by pulling though single layers individually as compared to a stack of the layers. A similar mechanism occurs for the StressWave process when treating individual layers. The indentation depth need not be as deep for a piece-part as compared to an assembly or "stack" of parts. As indentation depth is directly related to load, an advantageous reduction in maximum load occurs when treating piece-parts as compared to when treating an assembled structure. Reducing the required processing loads leads to reduced tool wear and reduced tool breakage. Also, the reduction in maximum load capacity requirement provides a reduction in load necessary to be provided in the manufacturing machines in which the StressWave equipment and tooling resides.

In one embodiment, the piece-part cold working allows parts to be made and treated at different times. Also, the piece-part cold working method allows cold working of parts in different places. Consequently, cold working of component parts can be effected by different companies using different machines and utilizing different manufacturing techniques. Cold working smaller components allows for greater handling ease, smaller machines, and smaller machine load capacity. Also, the cost of cold working parts is driven to the lowest tier supplier where cost is normally lowest. For the StressWave process, a further advantage is that by cold working a single layer of a piece-part there are fewer tool changes needed as compared to working an assembly.

Figure 1:
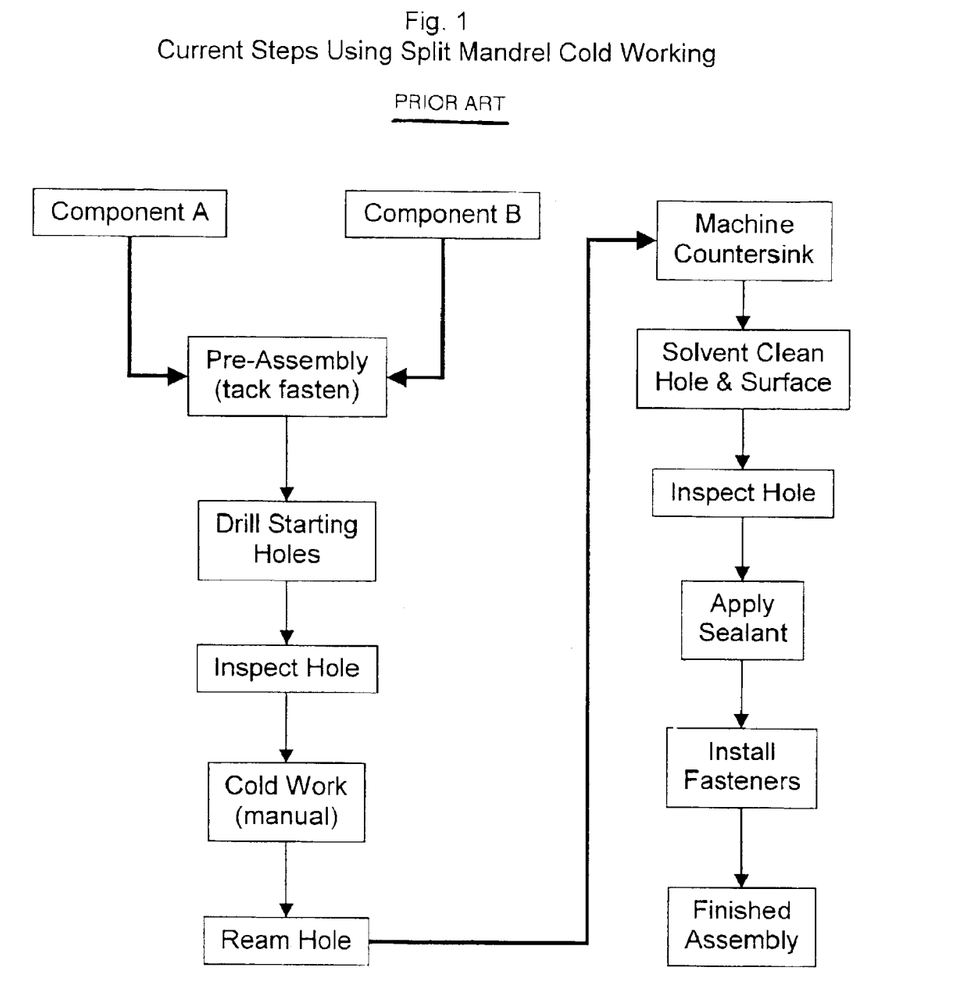
FIG. 1 illustrates the steps in a prior art method which is currently utilized in the application of split mandrel cold working to components for aircraft structures.
Figure 2:
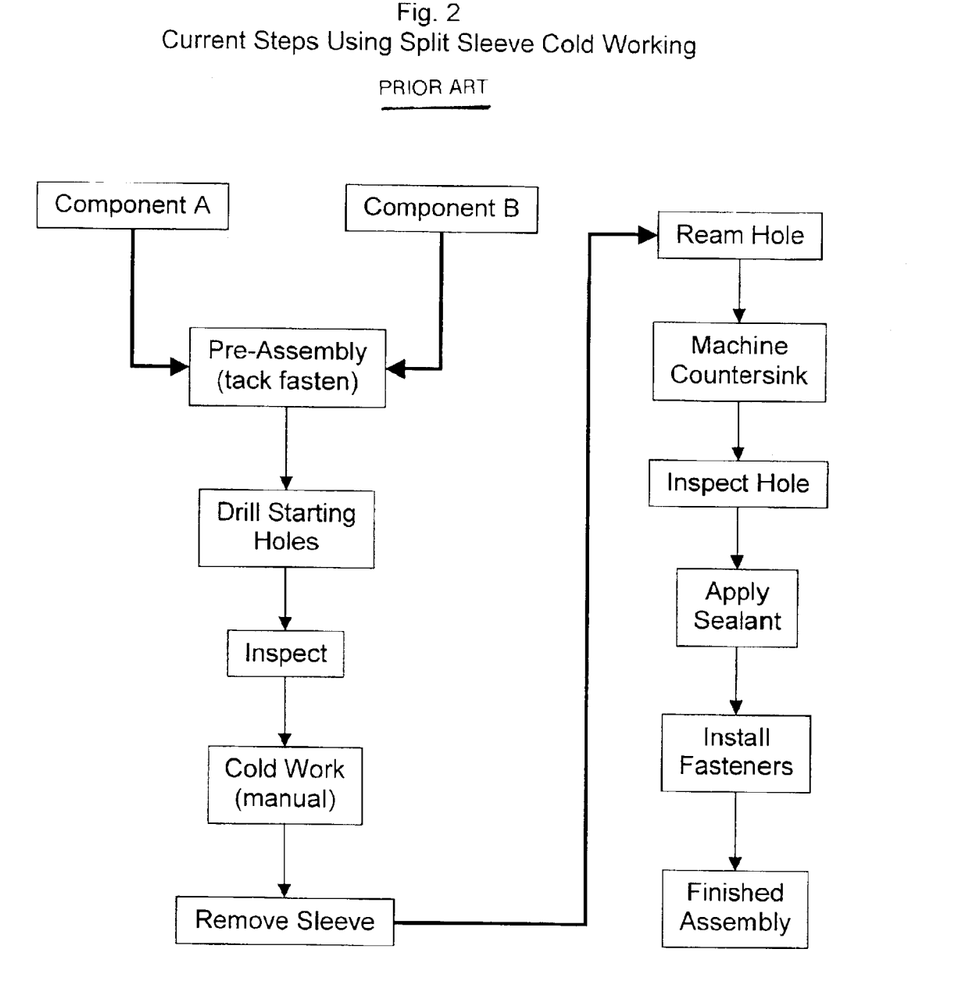
FIG. 2 illustrates the steps in a prior art method which is currently utilized in the application of split sleeve cold working to components for aircraft structures.

Turning now to the figures of the drawing, for further clarification of the upstream cold working process, three flow charts have been prepared. In FIG. 1, the flow chart shows a cold working method being used in final assembly—the baseline example. Specifically, this flow chart shows the various process steps required for split mandrel cold working. In FIG. 2, the flow chart also shows a cold working method being used in final assembly; more specifically, this flow chart shows the various process steps required for split sleeve cold working.

Figure 3:
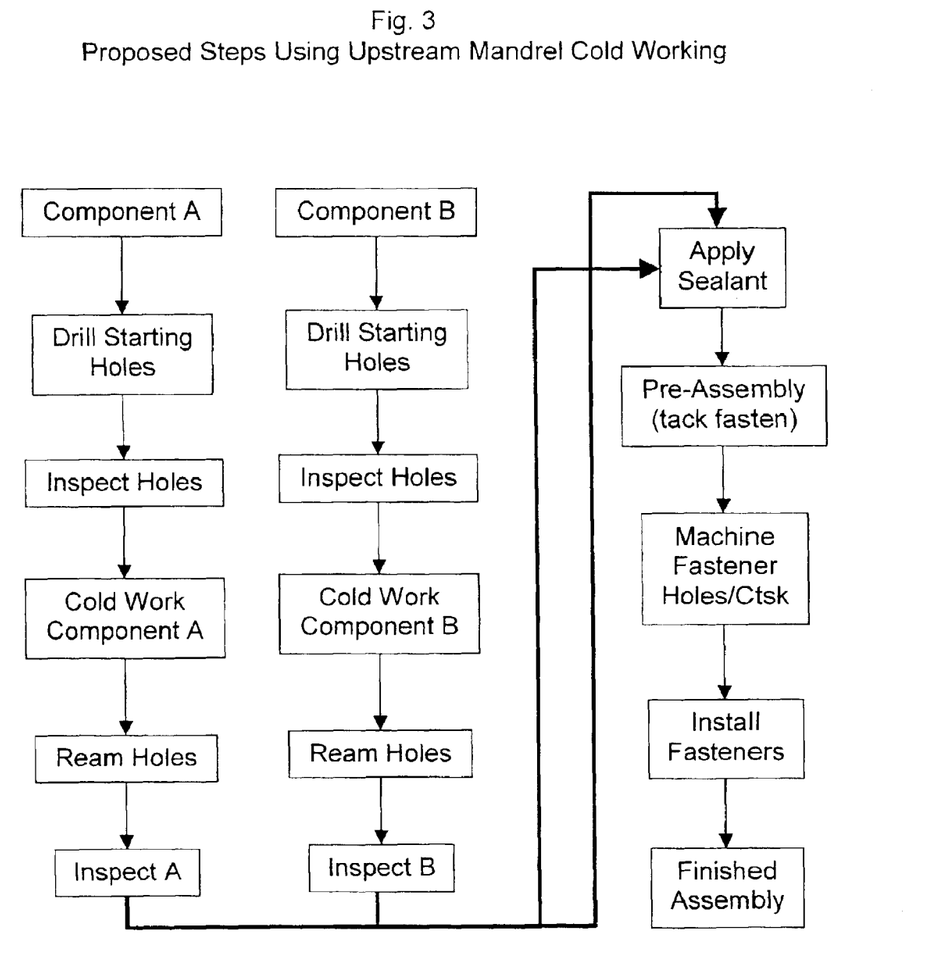
FIG. 3 illustrates one embodiment of the steps in a novel method for the application of split mandrel cold working to components in a method for the production of airframes or other structures.
Figure 4:
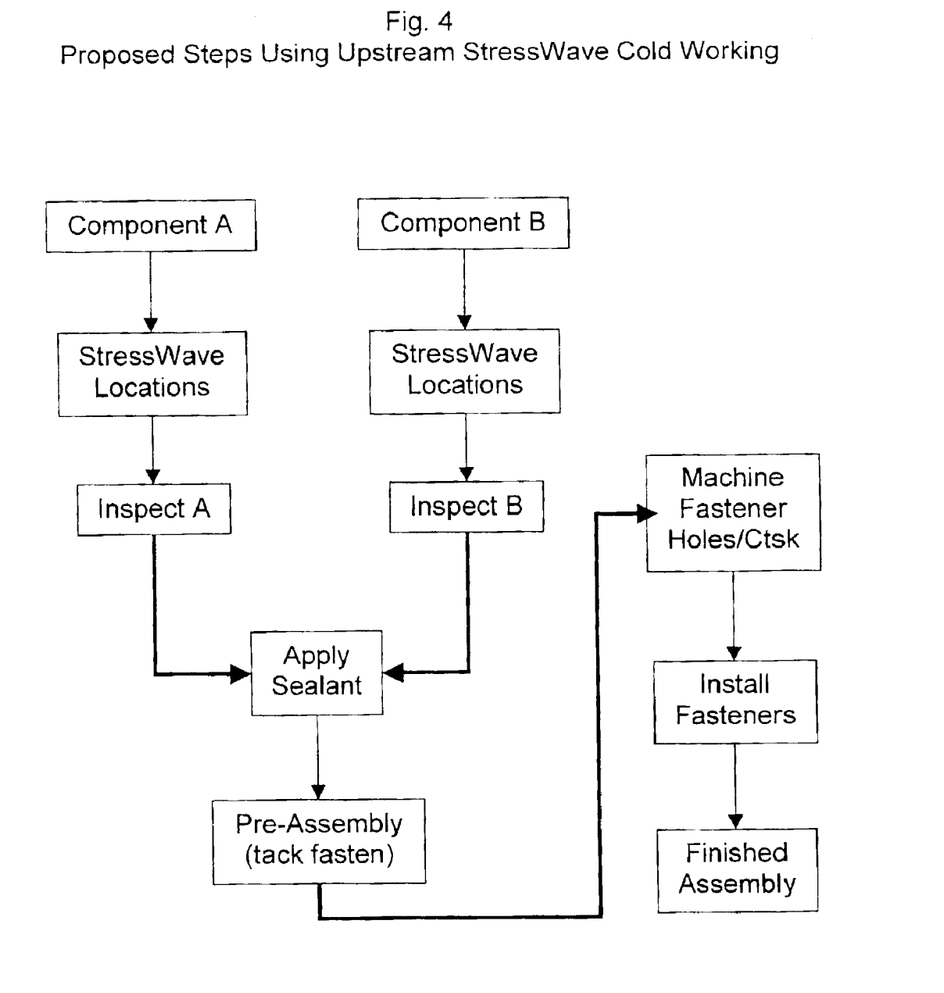
FIG. 4 illustrates one embodiment of the steps in a novel method for the application of the StressWave™ cold working process to components in a method for the production of airframes or other structures.

In FIG. 3, the flow chart shows the novel process steps for upstream mandrel cold working, utilizing either a split sleeve or a split mandrel process. In FIG. 4, the flow chart shows the novel steps for an upstream StressWave cold working process as used in the manufacture of various finished assemblies. In each of the figures, the cost of performing an operation normally rises as it is further along in the assembly process. Pushing cold working operations upstream, before final assembly, is anticipated to dramatically reduce the overall cost of the assembly.

In FIG. 1, entitled, "Current Steps Using Split Mandrel Cold Working," and in FIG. 2, entitled "Current Steps Using Split Sleeve Cold Working," the steps are shown as typically used in prior art cold working for the manufacture of an assembled part. The workpieces labeled components A and B are manufactured separately and are brought together in the production final assembly environment. Typically, the parts are tack fastened together in a positioning fixture. Then, undersized starting holes are drilled in the desired location of those fasteners that are to receive cold working. The starting holes are then inspected to ensure that they conform to the tight diametric tolerance, normally in the range of about of 0.002 to 0.003 inches. The holes are then cold worked, using manual tooling. Liquid lubricant, such as cetyl alcohol, is applied to the hole prior to drawing the mandrel through the hole. After cold working the holes are machined to their desired diameter to accommodate a fastener. A countersink operation optionally takes place for those holes receiving flush mounted fasteners. The hole and surrounding surface are then solvent cleaned to remove all traces of liquid lubricant. The hole diameter and countersink depth are then inspected. A sealant is applied between Components A and B to provide protection against corrosion or galvanic interaction. The parts are then brought together for installation of the fasteners resulting in a finished assembly. Clearly, this is a long and labor intensive process, and it must be carried out during the assembly of component A to component B.

In FIG. 3, entitled, "Proposed Steps Using Upstream Mandrel Cold Working", the steps used in cold working piece-parts prior to assembly is shown. The workpieces labeled components A and B are manufactured and cold worked separately. The process steps before assembly are drill starting holes, inspect starting hole diameters, mandrel cold work, solvent clean (if necessary), optionally ream holes, straighten components, then inspect. The cold worked components are then brought together in the production assembly environment. The parts are tack fastened together in a positioning fixture. Holes are machined to their desired diameter to accommodate a fastener. A countersink operation optionally takes place for those holes receiving flush mounted fasteners. The hole bore and the countersink may optionally be machined at the same time. Because the holes are drilled on an automated device an inspection of the final hole is done on a sampling inspection basis. Sealant is then applied between Components A and B to provide protection against corrosion or galvanic interaction. The parts are then brought together for installation of the fasteners resulting in a finished assembly.

In FIG. 4, entitled, "Proposed Steps Using Upstream StressWave Cold Working", the steps used in StressWave cold working as applied to piece-parts prior to assembly are shown, in one method for carrying out a method for the manufacture of fatigue life enhanced products. The components labeled A and B are manufactured and cold worked separately. The process steps before assembly are StressWave cold work, optionally ream holes, straighten components, and then inspect. The cold worked components are then brought together in the production assembly environment. The parts are tack fastened together in a positioning fixture. Sealant may be applied prior to tack fastening the parts together for those components where the final hole has not yet been drilled. Holes are machined to their desired final diameter to accommodate a fastener. A countersink operation optionally takes place for those holes receiving flush mounted fasteners. The hole bore and the countersink may optionally be machined at the same time. Because the holes are drilled on an automated device an inspection of the final hole is done on a sampling inspection basis. If sealant has not been previously applied between the components and the same is desired, it is now applied between Components A and B to provide protection against corrosion or galvanic interaction. The parts are then brought together for installation of the fasteners resulting in a finished assembly It is important to appreciate that the method of production of fatigue life enhanced products as described herein is applicable to a variety of materials and components, including sheets, plates, forgings, extrusions, castings, or other materials capable of being cold worked to provide fatigue life enhancement. Also, differing shapes, can be worked. As noted hereinabove, differing treatment can be effected using the same cold working process, and/or, differing cold working processes can be utilized. Workpieces can be processed at different times, and at different locations, and brought together at an assembly plant for final assembly. Further, coatings, such as a chromium anodizing compound, can be applied after cold working (rather than before cold working), which method minimizes any cracking that might occur during cold working and adversely reducing corrosion resistance, as is inherent in prior art methods known to us. As disclosed and described herein, the locations of tack fasteners can be cold worked before bringing workpieces together, thus eliminating the need to manually cold work the same later. Further, different hole diameters, and features such as countersinks, can be easily addressed and the proper fatigue life enhancement operation performed on the workpiece. Upstream cold working can also be applied to perform a fatigue life enhancing operation on an area of a block or other unfinished material, to work the same during a less risky condition, without cutouts and weight reducing milling having occurred, and before such expensive processing has been further or fully carried out on the part.

More generally, described herein is a novel method for manufacture of a fatigue life enhanced product from a plurality of workpiece parts. On one embodiment, the method includes the steps of (a) performing at least one fatigue enhancing operation on a first workpiece at a first work station, and (b) performing at least one fatigue enhancing operation on a second workpiece at a second work station. Then, the first workpiece is transferred from the first work station to a first assembly station. Also, the second workpiece is transferred from the second work station to the first assembly station. At the first assembly station, the first workpiece and the second workpiece are joined to form a fatigue life enhanced product. In many products, a fastener is utilized to join the first and second workpieces. In a variation of the method just set forth, the step of performing at least one fatigue enhancing operation on a first workpiece may further include the step, at the first work station, of performing at least one fatigue enhancing operation on a third workpiece. Similarly, the step of performing at least one fatigue enhancing operation on a second workpiece may further include the step, at the second work station, of performing at least one fatigue enhancing operation on a fourth workpiece. When a third workpiece is utilized, it is transferred from the first work station to the first assembly station. Then, the third workpiece is joined with the first workpiece and with the second workpiece at the first assembly station, to form a fatigue life enhanced product. Similarly, when a fourth workpiece is utilized, the additional step of transferring the fourth workpiece from the second work station to the first assembly station is included. In such cases, the fourth workpiece is joined with the first workpiece and with the second workpiece at the first assembly station, in order to form a fatigue life enhanced product.

In a similar manner, the third workpiece may be transferred from the first work station to said first assembly station. Also, at which at least one fatigue enhancing operation may be performed on a fourth workpiece at said second work station along with, or simultaneously with, the step of performing at least one fatigue enhancing operation on the second workpiece. Then, the fourth workpiece can be transferred from the second work station to a first assembly station. At the first assembly station, the first, second, third, and fourth workpieces are joined together to form a fatigue life enhanced product.

In one advantageous method of practicing the invention, the step of performing at least one operation on the first workpiece at the first work station may comprise physically altering the first workpiece by indenting a preselected location on the first workpiece with an indenter having a preselected shape in the indenter surface portion. Similarly, the step of performing at least one operation on a second workpiece at the first work station may include physically altering the first workpiece by indenting the second workpiece at a preselected location with an indenter having a preselected shape in the indenter surface portion. When an indenter is utilized to create a dimple or similar shape in a structure as one fatigue enhancing operation or step in a method of creating fatigue life enhanced structures, then the further step of drilling a hole in the workpiece may be performed, substantially at the location where the dimple was provided, i.e., the location where at least one fatigue enhancing operation was performed on the workpiece.

The method just set forth may be advantageously utilized in the manufacture of airframes and subcomponents of the airframes. In one embodiment of the method described herein, it may be quite advantageous that the first work station and the second work station are physically located at separate manufacturing facilities. For example, the first workstation may be owned by a first entity, such as a first subcontractor, and the second workstation may be owned by a second entity, such as a second subcontractor, and the first final assembly station may be owned by an airframe manufacturer.

In another variation of the method set forth herein, the step of transporting the first workpiece from the first work station to the first final assembly station may be conducted without an intermediate processing stop. Alternately, the step of transporting the first workpiece from the first work station to the first final assembly station may be conducted with an intermediate processing stop at a fifth work station, where at least one additional processing step is conducted on the first workpiece.

In any event, regardless of the number of workpieces, or the number of workstations, airframes may ultimately be assembled utilizing a plurality of fasteners to join the workpieces together to form a fatigue life enhanced product. The method described herein may be advantageously practiced by utilizing a computer driven tool that is directed by a stored computer program and robotic devices to precisely travel to a desired location and thereat effect work on the first or any of the other workpieces. For example, the step of performing at least one fatigue enhancing operation on a first workpiece may be performed by utilizing a stored program in a programmed computer to control an end effect driver to direct an indenter to work on the first workpiece, and/or on the second workpiece, and/or on any of the other workpieces set forth.

Automation can be extended when a plurality of fasteners is used to the workpieces together, by utilizing a computer to direct one or more fastener installation tools to execute a stored computer program to effect work on one or more, or each one of, the fasteners.

In one case, where various workstations and a final assembly station are appropriately situated, a computerized control system in communication with the first work station, with the second work station, and with the final assembly station, can be configured so that the computerized control system includes sensors to determine that the first final assembly station is prepared to receive the first and second workpieces. Also, sensors can be employed to acknowledge that the first final assembly station receives the first and second workpieces. Then, the computerized program can directing one or more fastener installation tools to execute a stored computer program to effect work one or more fasteners to join the first and second workpieces to produce a fatigue life enhanced airframe, or subcomponent thereof. In a similar manner, the method may include the steps of performing at least one fatigue enhancing operation on a third workpiece at a third work station to form a fatigue enhancing feature in the workpiece, even when the third workstation is physically located at a remote site from the first final assembly station. Regardless, the method can include the step of installing a hole in the third workpiece at a fatigue enhancing feature, and then transporting the third workpiece to the first final assembly station, where it is joined with the first workpiece and with the second workpiece. Such assembly at the first final assembly station may occur simultaneously, to produce a fatigue life enhanced airframe, or subcomponent thereof. As an example, one advantageous configuration where the method may be employed is the case where one of the workpieces, such as the third workpiece as just set forth, is a wing skin. In such a case, the first workpiece is another wing component. When manufacturing subcomponents, such as a wing assembly, it may be advantageous to have, remote from the first final assembly station, a storage facility to store the third workpiece prior to transport to the first final assembly station.

As set forth herein it can be seen that the method described can be advantageously employed in the production of a fatigue life enhanced airframe from (before manufacture and assembly) a plurality of fatigue-limited metal parts. In such case, each of said metal parts may have a preselected performance criterion and thus a fatigue life improvement objective, for case in which residual compressive stress at holes in the metal part are improved in order to achieve an acceptable service life for the metal part. Consequently, in one embodiment, such a method includes providing a first workpiece at a first location, and then performing on the first workpiece at least one fatigue life enhancing operation to create residual compressive stress in one or more critical bounding portions of the first workpiece. Likewise a second workpiece is provided at a second location, and at that location, at least one fatigue life enhancing operation is performed on the second workpiece to create residual compressive stress in one or more critical bounding portions of the second workpiece. Then, the first workpiece and the second workpiece are transported to a first final assembly station situated at a third location, near or remote. At the first final assembly station, the first workpiece is joined with the second workpiece to produce a fatigue life enhanced airframe.

As mentioned above, it may be advantageous to utilize, for the step of providing at least one fatigue enhancing operation on a workpiece, the split mandrel cold working process. In any event, the final product may be, in addition to an airframe, a gas turbine or jet engine. In such cases, any one of the workpiece metal parts may be a component which is ultimately a rotating part in such a gas turbine or jet engine. Also, in many situations, the preselected performance criteria for the workpiece may include, or be based on, the reduction in weight of the part.

However, in one important embodiment, it would be advantageous to utilize, for the step of providing at least one fatigue enhancing operation on a workpiece, the StressWave process of using a properly shaped indenter, with a proper amount of force, to create a dimple shape in a workpiece, prior to installing a hole in the workpiece. Also in such cases, the final product may be, in addition to an airframe, a gas turbine or jet engine. Likewise in such cases, any one of the workpiece metal parts may be a component which is ultimately a rotating part in such a gas turbine or jet engine. And in many situations, the preselected performance criteria for the workpiece may include, or be based on, the reduction in weight of the part. As noted in FIG. 4, after the use of an indenter at a "StressWave Location" on a workpiece "Component A" or on a workpiece "Component B", the parts can be each individually inspected. Then, if necessary or advisable, sealant may be applied. In any case, then a pre-assembly step is performed, such as via the use of tack fasteners. The advantage of the present invention is then clearly evident, since the pre-assembled unit can be then machined to create one or more fastener holes (normally thousands, as in the case of wing components). After the holes have been installed in the workpiece components, such as Component A and Component B as noted, then the fasteners are installed, to produce a final assembly.

It is to be appreciated that the various aspects and embodiments of a method of manufacturing a fatigue life enhanced product as described herein are an important improvement in the state of the art. The method is simple to implement, and the products produced thereby will be robust, reliable, and susceptible to utilization of a variety of cold working techniques for various part configurations. Although only a few exemplary embodiments have been described in detail, various details are sufficiently set forth in the specification, in the drawing, and in the claims provided herein to enable one of ordinary skill in the art to make and use the invention(s), which need not be further described by additional writing in this detailed description.

Importantly, the aspects and embodiments described and claimed herein may be modified from those shown without materially departing from the novel teachings and advantages provided by this invention, and may be embodied in other specific forms without departing from the spirit or essential characteristics thereof. Therefore, the embodiments presented herein are to be considered in all respects as illustrative and not restrictive. As such, this disclosure is intended to cover the methods and structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s), as set forth in the appended claims, and as indicated by the drawing and by the foregoing description, is intended to include variations from the embodiments provided which are nevertheless described by the broad interpretation and range properly afforded to the plain meaning of the claims set forth below.

What is claimed is:

1. A method of manufacturing a fatigue life enhanced product from a plurality of workpiece parts, said method comprising:
    (a) performing at least one fatigue enhancing operation on a first workpiece at a first work station;
    (b) performing at least one fatigue enhancing operation on a second workpiece at a second work station;
    (c) transferring said first workpiece from said first work station to a first assembly station;
    (d) transferring said second workpiece from said second work station to said first assembly station;
    (e) joining said first workpiece and said second workpiece at said first assembly station to form a fatigue life enhanced product.

2. The method as set forth in claim 1, wherein a fastener is utilized to join said first and said second workpieces.

3. The method as set forth in claim 1, wherein the step of performing at least one fatigue enhancing operation on a first workpiece further comprises the step, at said first work station, of simultaneously performing at least one fatigue enhancing operation on a third workpiece.

4. The method as set forth in claim 3, further comprising
    (a) the step of transferring said third workpiece from said first work station to said first assembly station; and
    (b) joining said third workpiece with said first workpiece and with said second workpiece at said first assembly station to form a fatigue life enhanced product.

5. The method as set forth in claim 3, further comprising
    (a) transferring said third workpiece from said first work station to said first assembly station;
    (b) performing at least one fatigue enhancing operation on a fourth workpiece at said second work station simultaneously with performing at least one fatigue enhancing operation on said second workpiece;
    (c) transferring said fourth workpiece from said second work station to said first assembly station;
    (d) joining said first, second, third, and fourth workpieces together at said first assembly station to form a fatigue life enhanced product.

6. The method as set forth in claim 1, wherein the step of performing at least one fatigue enhancing operation on a second workpiece further comprises the step, at said second work station, of simultaneously performing at least one fatigue enhancing operation on a fourth workpiece.

7. The method as set forth in claim 6, further comprising
    (a) the step of transferring said fourth workpiece from said second work station to said first assembly station; and
    (b) joining said fourth workpiece with said first workpiece and with said second workpiece at said first assembly station to form a fatigue life enhanced product.

8. The method of claim 1 wherein the step of performing at least one operation on said first workpiece at said first work station comprises physically altering said first workpiece by indenting a preselected location on said first workpiece with an indenter having a preselected surface portion shape.

9. The method of claim 1 wherein the step of performing at least one operation on said second workpiece at said second work station comprises physically altering said second workpiece by indenting a preselected location on said second workpiece with an indenter having a preselected surface portion shape.

10. The method as set forth in claim 1, further comprising the step, after the step of performing at least one fatigue enhancing operation on said first workpiece or on said second workpiece, the step of drilling a hole in said first workpiece or in said second workpiece, respectively, substantially at the location where said at least one fatigue enhancing operation was performed on said first or said second workpiece.

11. The method as set forth in claim 1 wherein said fatigue life enhanced product comprises an airframe.

12. The method as set forth in claim 11 wherein said first work station and said second work station are physically located at separate manufacturing facilities.

13. The method as set forth in claim 12, wherein said first workstation is owned by a first entity, and said second workstation is owned by a second entity, and wherein said first final assembly station is owned by an airframe manufacturer.

14. The method as set forth in claim 1, wherein said step of transporting said first workpiece from said first work station to said first final assembly station is conducted without an intermediate processing stop.

15. The method as set forth in claim 1, wherein said step of transporting said first workpiece from said first work station to said first final assembly station is conducted with an intermediate processing stop at a fifth work station, and wherein at least one additional processing step is conducted on said first workpiece during said intermediate processing stop at said fifth work station.

16. The method as set forth in claim 1, wherein a plurality of fasteners are utilized to join said workpieces together to form said fatigue life enhanced product.

17. The method as set forth in claim 16, wherein the step of utilizing a plurality of fasteners to join said workpieces together comprises utilizing a computer to direct one or more fastener installation tools to execute a stored computer program to effect work on each of said one or more fasteners.

18. The method as set forth in claim 1, wherein the step of performing at least one fatigue enhancing operation on said first workpiece comprises utilizing a computer to direct a tool to execute a stored computer program to effect work on said first workpiece.

19. The method as set forth in claim 1, in which step a is performed by utilizing a stored program in a programmed computer to control an end effect driver to direct an indenter to work on said first workpiece.

20. The method as set forth in claim 1, in which step b is performed by utilizing a stored program in a programmed computer to control an end effect driver to direct an indenter to work on said second workpiece.

21. The method as set forth in claim 1, wherein said fatigue life enhanced product comprises a metal part in a gas turbine or jet engine.

22. The method as set forth in claim 21, wherein said metal part comprises a rotating part.

23. The method as set forth in claim 1, wherein the step of performing at least one fatigue enhancing operation on a first workpiece further comprises the step, at said first work station, of performing at least one fatigue enhancing operation on a third workpiece.

24. The method as set forth in claim 1, wherein the step of performing at least one fatigue enhancing operation on a second workpiece further comprises the step, at said second work station, of performing at least one fatigue enhancing operation on a fourth workpiece.

25. The method as set forth in claim 1, wherein joining said first workpiece and said second workpiece further comprises (i) pre-assembly of said first and said second workpieces (b) machining one or more fastener holes through said first and said second workpieces, and (c) installing a fastener at one or more of said one or more fastener holes, to join said first and said second workpieces to form a fatigue life enhanced product.

26. The method as set forth in claim 25, wherein prior to pre-assembly of said first and said second workpieces, a sealant is applied to seal said workpiece to said second workpiece.

27. The method as set forth in claim 26, wherein at least one of said workpieces comprises an aircraft wing skin.

28. A method for producing a fatigue life enhanced airframe from a plurality of fatigue-limited metal parts, each of said parts having a preselected performance criterion for improving the residual compressive stress at holes in the metal part to achieve an acceptable service life for the metal part, said method comprising:

(a) providing a first workpiece at a first location;

(b) performing on said first workpiece at least one fatigue life enhancing operation to create residual compressive stress in one or more critical bounding portions of the first workpiece;

(c) providing a second workpiece at a second location;

(d) performing on said second workpiece at least one fatigue life enhancing operation to create residual compressive stress in one or more critical bounding portions of the second workpiece;

(e) transporting said first workpiece and said second workpiece to a first final assembly station situated at a third location, (f) joining said first workpiece with said second workpiece to produce a fatigue life enhanced airframe.

29. The method as set forth in claim 28, wherein at least one fatigue life enhancing operation comprises providing an indenter, and indenting said workpiece at a preselected location where a hole is to be installed in said first or in said second workpiece, and wherein said indenter comprises a contact end for contact with said workpiece, and wherein said contact end comprises a shape which imparts a substantially uniform residual compressive stress in said one or more critical bounding portions of said first or in said second workpiece.

30. The method as set forth in claim 28, wherein said at least one fatigue life enhancing operation comprises utilizing the mandrel cold working process.

31. The method as set forth in claim 28, wherein said preselected performance criterion for said part comprises a reduction in weight of the part.

* * * * *